(12) United States Patent
Mirtorabi et al.

(10) Patent No.: US 9,608,900 B2
(45) Date of Patent: Mar. 28, 2017

(54) TECHNIQUES FOR FLOODING OPTIMIZATION FOR LINK STATE PROTOCOLS IN A NETWORK TOPOLOGY

(75) Inventors: Sina Mirtorabi, Menlo Park, CA (US); Abhay Roy, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 708 days.

(21) Appl. No.: 13/569,389

(22) Filed: Aug. 8, 2012

(65) Prior Publication Data
US 2014/0043956 A1    Feb. 13, 2014

(51) Int. Cl.
| | |
|---|---|
| H04L 12/28 | (2006.01) |
| H04L 12/24 | (2006.01) |
| H04L 12/721 | (2013.01) |
| H04L 12/751 | (2013.01) |
| H04L 12/705 | (2013.01) |
| H04L 12/703 | (2013.01) |
| H04L 12/753 | (2013.01) |

(52) U.S. Cl.
CPC ............. *H04L 45/32* (2013.01); *H04L 45/02* (2013.01); *H04L 45/18* (2013.01); *H04L 45/28* (2013.01); *H04L 45/48* (2013.01)

(58) Field of Classification Search
CPC ......... H04L 45/32; H04L 45/02; H04L 45/28; H04L 45/48
USPC .................................................. 370/216, 256
See application file for complete search history.

(56) References Cited

U.S. PATENT DOCUMENTS

| | | |
|---|---|---|
| 6,820,134 B1 | 11/2004 | Zinin et al. |
| 9,350,639 B2 | 5/2016 | Shand et al. |
| 2006/0045024 A1 | 3/2006 | Previdi et al. |
| 2010/0061269 A1* | 3/2010 | Banerjee et al. ............. 370/254 |
| 2011/0058567 A1 | 3/2011 | Wijnands et al. |
| 2011/0131302 A1* | 6/2011 | Bulusu .................. H04L 12/462 709/221 |
| 2012/0044837 A1* | 2/2012 | Ibanez Fernandez .. H04L 45/02 370/256 |

(Continued)

OTHER PUBLICATIONS

International Search Report and Written Opinion in counterpart International Application No. PCT/US2013/053582, mailed Dec. 9, 2013, 10 pages.

(Continued)

*Primary Examiner* — Andrew Lai
*Assistant Examiner* — Albert Shih
(74) *Attorney, Agent, or Firm* — Edell, Shapiro & Finnan, LLC (57) ABSTRACT

Techniques are provided for generating efficient flooding tree paths in a network. At a node device in a network, a unicast message is sent to a plurality of node devices in the network. The node device obtains an identifier associated with each of the node devices in the network. The identifier contains information indicating node connectivity for each of the node devices. A selected node device is then identified. The selected node device is one of the node devices in the network that has a lowest identifier value indicating a lowest number of connected node devices to the selected node device in the network. The selected node device is classified as a root flooding tree node device. A flooding tree is generated by performing a shortest path first operation from the selected node device to the plurality of node devices in the network.

16 Claims, 4 Drawing Sheets

(56) References Cited

U.S. PATENT DOCUMENTS

2012/0113871 A1 5/2012 Bulusu
2012/0147746 A1 6/2012 Shaffer et al.

OTHER PUBLICATIONS

English Translation of Office Action in counterpart Chinese Application No. 201380041986.0, issued Nov. 4, 2016, 7 pages.

* cited by examiner

NODE IDENTIFIER DATABASE

| NETWORK NODE | NODE CONNECTIVITY | IDENTIFIER VALUE |
|---|---|---|
| 1 | 2;4;5 | 3 |
| 2 | 1;4;6 | 3 |
| 3 | 4;6 | 2 |
| 4 | 1;2;3;5 | 4 |
| 5 | 1;4;6 | 3 |
| 6 | 2;3;5 | 3 |

TECHNIQUES FOR FLOODING OPTIMIZATION FOR LINK STATE PROTOCOLS IN A NETWORK TOPOLOGY

TECHNICAL FIELD

The present disclosure relates to evaluating a network topology to optimize packet distributions.

BACKGROUND

Link state protocol (LSP) messages use reliable flooding to propagate link state information within a network. These LSP messages are distributed hop-by-hop within a network such that LSP packets are sent from a network node to every adjacent neighbor node in the network. These techniques have scalability limits, as the LSP message distribution techniques within the network are inefficient and redundant.

DESCRIPTION OF EXAMPLE EMBODIMENTS

Overview

Techniques are provided for generating efficient flooding tree paths in a network. These techniques may be embodied as a method, apparatus and instructions in a computer-readable storage media to perform the method. At a node device in a network, a unicast message is sent to a plurality of node devices in the network. The node device obtains an identifier associated with each of the node devices in the network. The identifier contains information indicating node connectivity for each of the node devices. A selected node device is then identified. The selected node device is one of the node devices in the network that has a lowest identifier value indicating a lowest number of connected node devices to the selected node device in the network. The selected node device is classified as a root flooding tree node device. A flooding tree is generated by performing a shortest path first operation from the selected node device to the plurality of node devices in the network.

Example Embodiments

Figure 1:
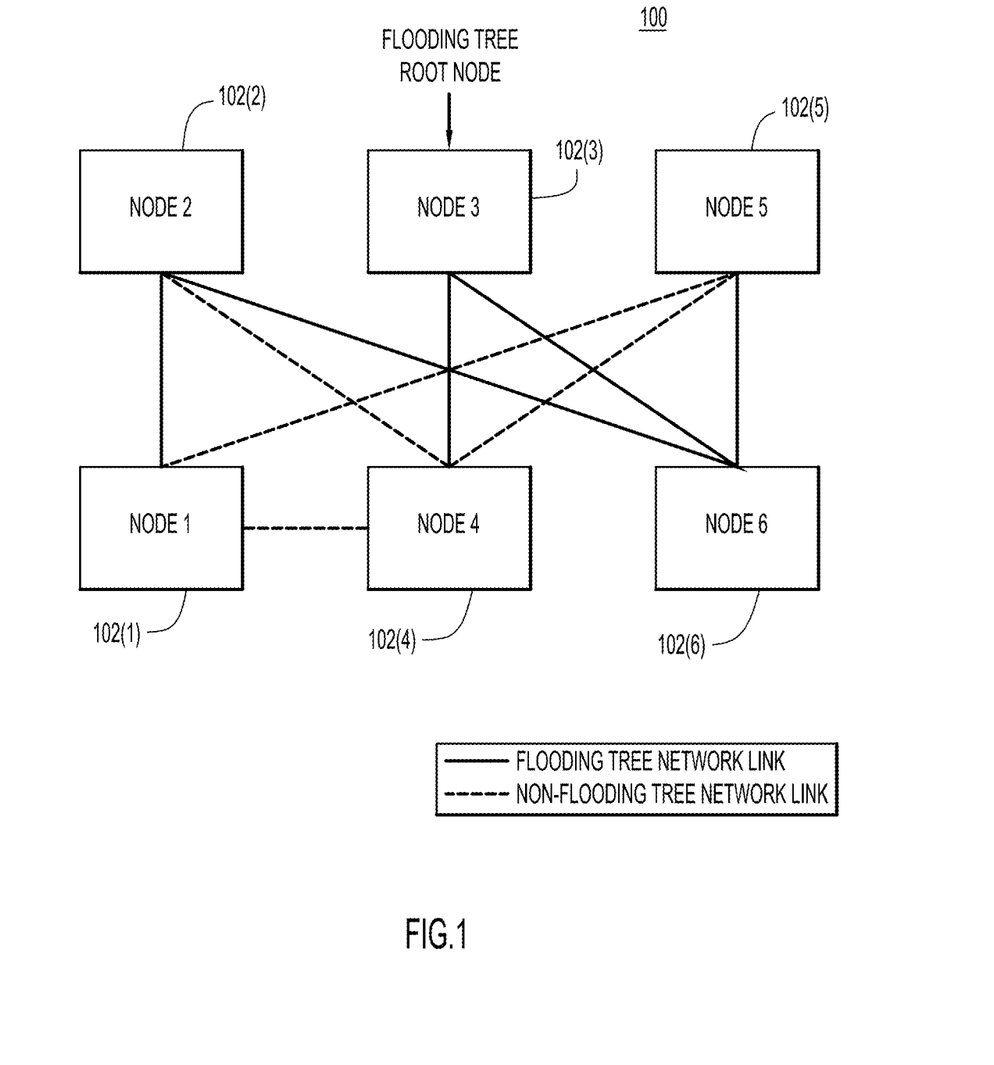
FIG. 1 shows an example network including a plurality of network nodes and a flooding tree path used to distribute packets efficiently in the network.

The techniques described herein relate to generating an optimal flooding tree communication path within a network to for packet communications to network nodes. One or more network nodes within the network may perform these techniques. An example system/topology 100 is illustrated in FIG. 1. The topology 100 (hereinafter "network topology" or "network") comprises a plurality of network node devices (hereinafter "network nodes" or "nodes") 102(1)-102(6) (also referred to as "node 1"-"node 6," respectively). The network nodes 102(1)-102(6) are connected to one another across one or more network links. For example, in a fully meshed network (not shown in FIG. 1), each of the network nodes are connected to every other network node across a corresponding network link. In another example, in a partially meshed network (shown in FIG. 1), each of the network nodes may be connected to one or more, but not all, of the other network nodes. It should be appreciated that network 100 may be any network topology comprising a plurality of network nodes (e.g., a fully-meshed network, a partially-meshed network, a ring network topology, a Clos network, etc.). For simplicity, a partially-meshed network is shown, by way of example only.

Packets (e.g., link state packets, broadcast packets, etc.) may be sent along one or more of the network links to the nodes 102(1)-102(6). Often, packets may be broadcast to all of the nodes 102(1)-102(6) in the network 100. For example, information pertaining to network updates, administration and topology/architecture, etc., may need to be distributed to all of the nodes 102(1)-102(6). As described by the techniques herein, a flooding tree path ("flooding tree") in the network 100 may be generated by one or more of the nodes 102(1)-102(6) to ensure that packets with such information are able to reach all of the nodes in the network 100 efficiently. For example, as shown in FIG. 1, one of the nodes 102(1)-102(6), e.g., node 102(3), may be selected as a root node for the flooding tree, according to the techniques described herein. It should be appreciated that more than one flooding tree may be generated in the network 100, wherein each flooding tree has a corresponding root node.

FIG. 1 shows two types of network links: flooding tree network links and non-flooding tree network links. The flooding tree network links are depicted by solid lines in FIG. 1, while the non-flooding tree network links are depicted by dashed lines in FIG. 1. The flooding tree network links and non-flooding tree network links may be similar to each other. For example, the network links may be Ethernet or other network links capable of sending and receiving data packets to and from network nodes. The classification of a network link as a flooding tree network link or a non-flooding tree network link is performed by one or more of the nodes 102(1)-102(6) as a part of a process for generating a flooding tree, as described herein.

Figure 2:
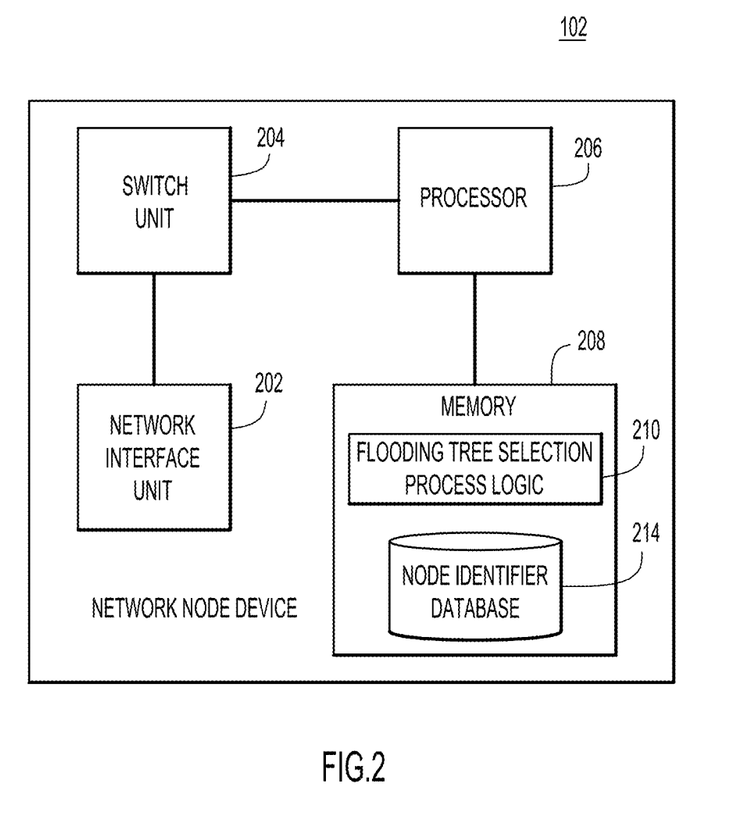
FIG. 2 shows an example block diagram of a network node configured to generate a flooding tree path in the network.

Reference is now made to FIG. 2. FIG. 2 shows an example block diagram of one of the nodes 102(1)-102(6). The block diagram is depicted generally as a network node device at reference numeral 102, though it should be appreciated that this diagram may represent any of the nodes 102(1)-102(6). The network node device 102 comprises, among other components, a network interface unit 202, a switch unit 204, a processor 206 and a memory 208. The network interface unit 202 is configured to receive communications (e.g., data packets) sent in the network 100 from other node devices and to send communications in the network 100 to the other node devices across one or more network links. The network interface unit 202 is coupled to a switch unit 204. The switch unit 204 is configured to perform packet switching/forwarding operations on packets received from other network nodes in the network 100. Additionally, the switch unit 204 is configured to select a network node in the network 100 to operate as root nodes for a flooding tree generated by the network node 102. The switch unit 204 may be embodied in one or more application specific integrated circuits.

The switch unit 204 is coupled to the processor 206. The processor 206 is, for example, a microprocessor or microcontroller that is configured to execute program logic instructions (i.e., software) for carrying out various operations and tasks of the network node 102, as described herein. For example, the processor 206 is configured to execute flooding tree selection process logic 210 to generate a flooding tree in the network 100 and to select a root node for the flooding tree. The functions of the processor 206 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 208 may comprise read only memory (ROM), random access memory (RAM), magnetic disk storage media devices, optical storage media devices, flash memory devices, electrical, optical, or other physical/tangible (non-transitory) memory storage devices. The memory 208 stores software instructions for the flooding tree selection process logic 210. The memory 208 may also host a node identifier database ("database") 214 that stores, for example, node connectivity information for each of the nodes 102(1)-102(6) in the network 100. Thus, in general, the memory 206 may comprise one or more computer readable storage media (e.g., a memory storage device) encoded with software comprising computer executable instructions and when the software is executed (e.g., by the processor 206) it is operable to perform the operations described for the flooding tree selection process logic 210.

The flooding tree selection process logic 210 may take any of a variety of forms, so as to be encoded in one or more tangible computer readable memory media or storage device for execution, such as fixed logic or programmable logic (e.g., software/computer instructions executed by a processor), and the processor 206 may be an application specific integrated circuit (ASIC) that comprises fixed digital logic, or a combination thereof.

In still another example, the processor 206 may be embodied by digital logic gates in a fixed or programmable digital logic integrated circuit, which digital logic gates are configured to perform the flooding tree selection process logic 210. In general, the flooding tree selection process logic 210 may be embodied in one or more computer readable storage media encoded with software comprising computer executable instructions and when the software is executed operable to perform the operations described hereinafter.

In general, one or more of the nodes 102(1)-102(6) may be identified as a root node for a flooding tree in the network 100. The flooding tree in the network 100 allows for efficient routing of packets within the network 100. In other words, packets that are intended to be distributed to all nodes 102(1)-102(6) can traverse the network 100 along the generated flooding tree path to ensure that each node receives the packet without traversing unnecessary or redundant network links. These techniques improve existing flooding techniques that instruct packets to be sent from every node to all adjacent nodes in a network. Thus, existing techniques may result in nodes receiving packets multiple times across redundant network links, thereby limiting the scalability of the network for a large number of network nodes. The techniques described herein alleviate these problems by utilizing the flooding tree to efficiently route packets to all nodes in the network. The flooding tree described herein may be a shared tree at a given node that spans all of the nodes in a network. In one example, the flooding tree is a broadcast tree, for example, in FabricPath network topologies. Additionally, more than one flooding tree may be generated (e.g., as configured be a network user or administrator) by any of the nodes 102(1)-102(6).

Figure 3:
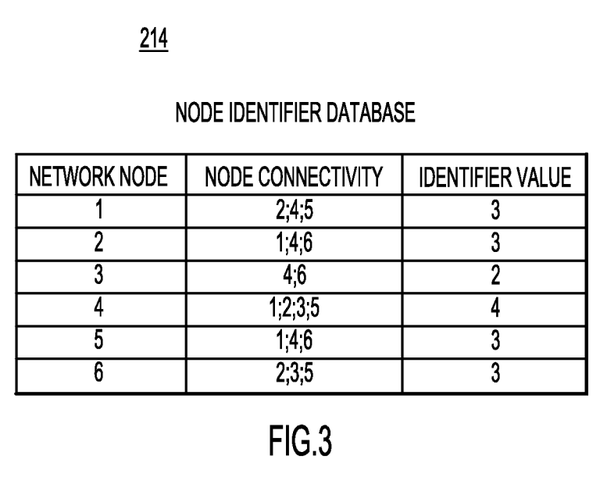
FIG. 3 illustrates a node identifier database accessible by the network node to identify a selected node in the network as a root flooding tree node.

In order to select the flooding tree path in the network 100, each of the nodes 102(1)-102(6) is configured to gather and access node connectivity information associated with every other node in the network 100 (e.g., from the node identifier database 214 accessible by the nodes 102(1)-102(6)). Based on the node connectivity information, the nodes 102(1)-102(6) can determine which node to classify or select as a root node for the flooding tree (e.g., "root flooding tree node device"). After determining the root node for the flooding tree, the nodes 102(1)-102(6) can determine the flooding tree path by performing a shortest path first (SPF) operation from the root flooding tree node to the plurality of node devices in the network.

Reference is now made to FIG. 3. FIG. 3 shows the node identifier database 214 that is stored and/or accessible by each of the nodes 102(1)-102(6). For example, the node identifier database 214 may be stored in memory of each of the nodes 102(1)-102(6) (as described above in connection with FIG. 2) or may be stored remotely such that each of the nodes 102(1)-102(6) is able to access the contents of the database 214. Additionally, each of the nodes 102(1)-102(6) is able to update the database 214 with node connectivity information. For example, if the topology of network 100 changes, each of the nodes 102(1)-102(6) can update the node connectivity information in the database 214 to reflect the change in network topology.

As shown in FIG. 1, each of the nodes 102(1)-102(6) may be connected to other nodes in the network 100. This node connectivity information is stored in the database 214 for each of the nodes 102(1)-102(6), as shown in FIG. 3. Additionally, each of the nodes 102(1)-102(6) has a corresponding identifier value that indicates the number of nodes connected to each one of the nodes 102(1)-102(6). Nodes with low identifier values may indicate a high priority to be classified as a root node for a flooding tree, while nodes with high identifier values may indicate a low priority to be classified as a root node for a flooding tree. For example, the database 214 shows node 1 as being connected to node 2, node 4 and node 5 with an identifier value of "3" (representing each of the nodes to which node 1 is directly connected). The identifier value may be a switch identifier ("switch ID") that may be calculated during standard SPF calculations between a given node and nodes attached to the given node in the network 100.

As shown, the database 214 stores data indicating the node connectivity and corresponding identifier for each of the nodes 102(1)-102(6) in the network. In one example, in order to generate a flooding tree path in the network 100, a network node with the lowest identifier value may be identified and selected (e.g., by any of the nodes 102(1)-102(6)) as the root node for the flooding tree. Upon selecting the root node for the flooding tree, the flooding tree path may be generated by computing the shortest path tree from the root node of the flooding tree. For example, a Djikstra algorithm or any other shortest path tree algorithm may be used to determine the flooding tree from the root node of the flooding tree.

For example, as shown in FIG. 1 and FIG. 3, node 3 is selected as the root node for the flooding tree since it has the lowest identifier value. Thus, after node 3 is selected as the root node for the flooding tree, a shortest path tree algorithm is applied to determine the SPF originating from node 3 and reaching all of the nodes in the network. This SPF defines the flooding tree in the network. In FIG. 1, for example, the SPF from node 3 is defined as follows (and depicted by the solid lines for the flooding tree network links in FIG. 1):

Node 3-Node 4
Node 3-Node 6-Node 5
Node 3-Node 6-Node 2-Node 1

Thus, the flooding tree path originates from node 3 and the path reaches each of the nodes in the network by following the SPF path described above. If a packet is to be distributed to all nodes in the network (e.g., link state packets, broadcast packets, etc.), the packet can traverse the flooding tree described above to reach all of the nodes in the network 100 without any redundant packet distribution to network nodes. In other words, packets can be sent to all nodes in the network across the flooding tree path using a number of network links in the network 100 less than that which would be used without the flooding tree.

In the event of one or more link failures or other network disruption events in the network 100, the flooding tree can be updated to enable network connections to node devices associated with the network disruption event. For example, if a non-flooding tree network link is removed from the network 100, the flooding tree path may not be altered since packet flooding may still occur to network nodes over the flooding tree even with the removal of the non-flooding tree network link. If, however, a flooding-tree network link is removed from the network 100, flooding packets may be distributed along the flooding tree path up until the removed network link. After a packet cannot further traverse the original flooding tree (due to the removed link), the last node to receive the packet will perform a new SPF operation to determine the SPF path to the remaining nodes in the network 100. Thus, in response to the removal of a flooding tree network link, two (or more) flooding trees will reside in network 100: the first flooding tree defined as the original flooding tree up until the removed link, and the second flooding tree defined as the new SPF from the last node receiving the packet in the first flooding tree to the remaining nodes in the network. In other words, the last node receiving the packet in the first flooding tree will be classified as a new root node of the new flooding tree and a new flooding tree will be generated by performing a new SPF operation from this new root node.

It should be appreciated that there may be more than one flooding tree in the network 100. In the vent of a link failure in one of the flooding tree, where a node loses its path to the flooding tree, another one of the flooding trees deliver the packets within the network 100. That is, if there are two flooding trees, when packets are flooded in the network 100, they are flooded over both of the flooding trees.

If, for example, there is one flooding tree in the network, in response to a link failure, a network node will run an SPF operation to find another path from a root node to itself. Therefore, the network node becomes reconnected to the flooding tree. In one example, the new SPF operation will return the same flooding tree rooted at one of the nodes in the original flooding tree, with a flooding tree path changed. In other words, in response to a link failure, the flooding tree may be recalculated instead of calculating additional flooding trees in the network 100.

Figure 4:
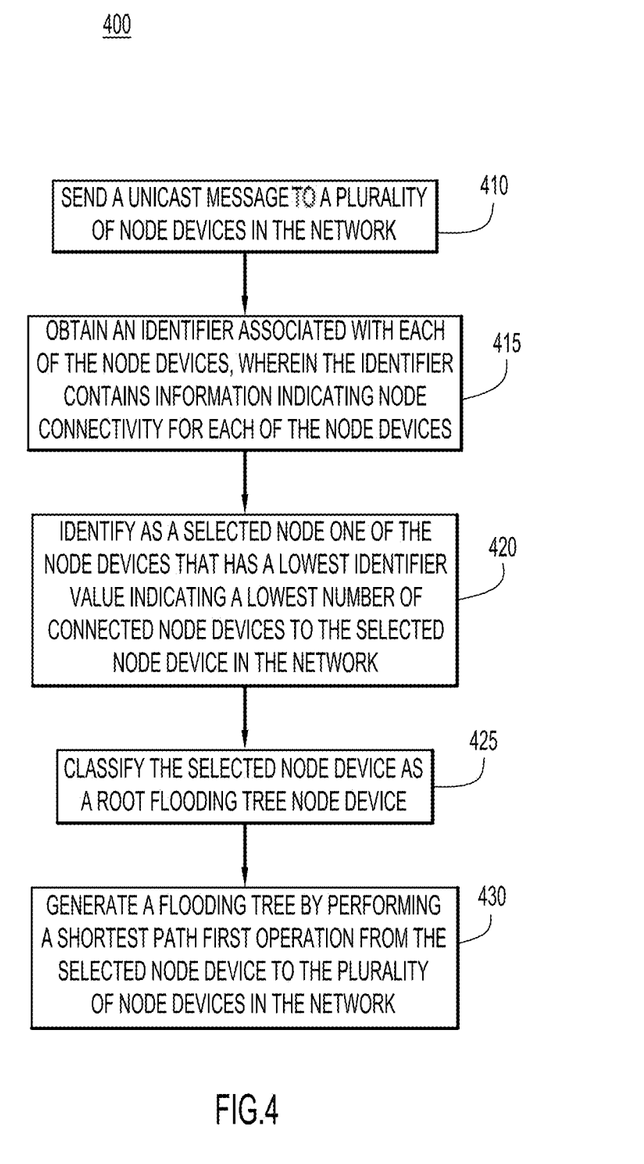
FIG. 4 shows an example flow chart depicting operations performed by one or more of the network nodes to select a root flooding tree node and to generate a flooding tree path in the network.

Reference is now made to FIG. 4. FIG. 4 shows a process 400 comprising operations of the flooding tree selection process logic 210 utilized by one or more of the nodes 102(1)-102(6) to select the root node and to generate the flooding tree. At operation 410, a node sends a unicast message to a plurality of node devices in the network. An identifier is then obtained, at operation 415 that is associated with each of the node devices. The identifier contains information indicating node connectivity for each of the node devices. At operation 420, one of the node devices is identified as a selected node that has a lowest identifier value indicating a lowest number of connected node devices to the selected node device in the network. At operation 425, the selected node is classified as a root flooding tree node device, and a flooding tree is generated, at operation 430, by performing a shortest path first operation from the selected node device to the plurality of node devices in the network.

It should be appreciated that the techniques described above in connection with all embodiments may be performed by one or more computer readable storage media that is encoded with software comprising computer executable instructions to perform the methods and steps described herein. For example, the operations performed by one or more of the network nodes 102(1)-102(6) may be performed by one or more computer or machine readable storage media (non-transitory) or device executed by a processor and comprising software, hardware or a combination of software and hardware to perform the techniques described herein.

In sum, a method is provided comprising: at a node device in a network, sending a unicast message to a plurality of node devices in the network; obtaining an identifier associated with each of the node devices, wherein the identifier contains information indicating node connectivity for each of the node devices; identifying as a selected node device one of the node devices that has a lowest identifier value indicating a lowest number of connected node devices to the selected node device in the network; classifying the selected node device as a root flooding tree node device; and generating a flooding tree by performing a shortest path first operation from the selected node device to the plurality of node devices in the network.

In addition, one or more computer readable storage media encoded with software is provided comprising computer executable instructions and when the software is executed operable to: send a unicast message to a plurality of node devices in a network; obtain an identifier associated with each of the node devices, wherein the identifier contains information indicating node connectivity for each of the node devices; identify as a selected node device one of the node devices that has a lowest identifier value indicating a lowest number of connected node devices to the selected node device in the network; classify the selected node device as a root flooding tree node device; and generate a flooding tree by performing a shortest path first operation from the selected node device to the plurality of node devices in the network.

Additionally, an apparatus is provided, comprising: a network interface unit; a switch unit coupled to the network interface unit; a memory; and a processor coupled to the switch unit and the memory and configured to: send a unicast message to a plurality of node devices in a network; obtain an identifier associated with each of the node devices, wherein the identifier contains information indicating node connectivity for each of the node devices; identify as a selected node device one of the node devices that has a lowest identifier value indicating a lowest number of connected node devices to the selected node device in the network; classify the selected node device as a root flooding tree node device; and generate a flooding tree by performing a shortest path first operation from the selected node device to the plurality of node devices in the network.

The above description is intended by way of example only. Various modifications and structural changes may be made therein without departing from the scope of the concepts described herein and within the scope and range of equivalents of the claims.

What is claimed is:

1. A method comprising:
at a node device among a plurality of node devices in a network, obtaining a plurality of identifiers associated with respective node devices, wherein each of the identifiers contains information indicating how many node devices in the network are connected by network links to the respective node devices;
based on the plurality of identifiers, selecting a node device that has an identifier value indicating a fewest number of connected node devices to the selected node device in the network;
classifying the selected node device as a root flooding tree node device;
generating a flooding tree by performing a shortest path first operation from the selected node device to the plurality of node devices in the network;
sending a packet in the flooding tree using the selected node device as a root flooding tree node device;
detecting a network disruption event in the flooding tree, the network disruption event comprising a removed network link to at least one affected node device;
updating the flooding tree to enable network connections of one or more network links to the at least one affected node device by classifying another one of the node devices other than the selected node device as a new root flooding tree node device, and generating a new flooding tree by performing a new shortest path first operation from the new root flooding tree node device to the plurality of node devices in the network; and
sending the packet in the new flooding tree using the new root flooding tree node device;
wherein the node device classified as the new root flooding tree node device is the last node device before the removed network link; and
wherein sending the packet includes forwarding the packet to the at least one affected node device from the new root flooding tree node device using the new flooding tree.

2. The method of claim 1, further comprising broadcasting link state network packets to the node devices in the flooding tree such that the link state network packets are sent to all node devices in the network.

3. The method of claim 2, wherein broadcasting comprises broadcasting the link state packets to all node devices in the network using a number of network links in the network less than that which would be used if broadcasting the packets without the flooding tree.

4. The method of claim 2, wherein the flooding tree is a broadcast tree.

5. The method of claim 1, further comprising:
in response to the detecting of the network disruption event, broadcasting link state network packets to the node devices in the new flooding tree such that the link state network packets are sent to all node devices in the network.

6. The method of claim 1, wherein obtaining comprises obtaining switch identifier information that identifies node connectivity such that a high switch identifier value indicates a low priority root node for the flooding tree and a low switch identifier value indicates a high priority root node for the flooding tree.

7. One or more non-transitory computer readable storage media encoded with software comprising computer executable instructions and when the software is executed operable to cause a processor to:
obtain a plurality of identifiers associated with respective node devices in a network, wherein each of the identifiers contains information indicating how many node devices in the network are connected by network links to the respective node devices;
based on the plurality of identifiers, select a node device that has an identifier value indicating a fewest number of connected node devices to the selected node device in the network;
classify the selected node device as a root flooding tree node device;
generate a flooding tree by performing a shortest path first operation from the selected node device to the plurality of node devices in the network;
send a packet in the flooding tree using the selected node device as a root flooding tree node device;
detect a network disruption event in the flooding tree, the network disruption event comprising a removed network link to at least one affected node device;
update the flooding tree to enable network connections of one or more network links to the at least one affected node device by classifying another one of the node devices other than the selected node device as a new root flooding tree node device, and generating a new flooding tree by performing a new shortest path first operation from the new root flooding tree node device to the plurality of node devices in the network; and
send the packet in the new flooding tree using the new root flooding tree node device;
wherein the node device classified as the new root flooding tree node device is the last node device before the removed network link; and
wherein the instructions operable to send the packet include instructions operable to forward the packet to the at least one affected node device from the new root flooding tree node device using the new flooding tree.

8. The computer readable storage media of claim 7, further comprising instructions operable to broadcast link state network packets to the node devices in the flooding tree such that the link state network packets are sent to all node devices in the network.

9. The computer readable storage media of claim 8, wherein the instructions operable to broadcast comprise instructions operable to broadcast the link state packets to all node devices in the network using a number of network links in the network less than that which would be used if broadcasting the packets without the flooding tree.

10. The computer readable storage media of claim 7, further comprising instructions operable to:
in response to detecting the network disruption event, broadcast link state network packets to the node devices in the new flooding tree such that the link state network packets are sent to all node devices in the network.

11. The computer readable storage media of claim 7, wherein the instructions operable to obtain comprise instructions operable to obtain switch identifier information that identifies node connectivity such that a high switch identifier value indicates a low priority root node for the flooding tree and a low switch identifier value indicates a high priority root node for the flooding tree.

12. An apparatus comprising:
a network interface unit;

a switch unit coupled to the network interface unit;
a memory; and
a processor coupled to the switch unit and the memory and configured to:
- obtain via the network interface unit, a plurality of identifiers associated with respective node devices in a network, wherein each of the identifiers contains information indicating how many node devices in the network are connected to the respective node devices;
- based on the plurality of identifiers, select a node device that has an identifier value indicating a fewest number of connected node devices to the selected node device in the network;
- classify the selected node device as a root flooding tree node device;
- generate a flooding tree by performing a shortest path first operation from the selected node device to the plurality of node devices in the network;
- send a packet in the flooding tree using the selected node device as a root flooding tree node device;
- detect a network disruption event in the flooding tree, the network disruption event comprising a removed network link to at least one affected node device;
- update the flooding tree to enable network connections of one or more network links to the at least one affected node device by classifying another one of the node devices other than the selected node device as a new root flooding tree node device, and generating a new flooding tree by performing a new shortest path first operation from the new root flooding tree node device to the plurality of node devices in the network; and
- send the packet in the new flooding tree using the new root flooding tree node device;
  - wherein the node device classified as the new root flooding tree node device is the last node device before the removed network link; and
  - wherein the processor is operable to send the packet by forwarding the packet to the at least one affected node device from the new root flooding tree node device using the new flooding tree.

13. The apparatus of claim 12, wherein the processor is further configured to broadcast link state network packets to the node devices in the flooding tree such that the link state network packets are sent to all node devices in the network.

14. The apparatus of claim 13, wherein the processor is further configured to broadcast the link state packets to all node devices in the network using a number of network links in the network less than that which would be used if broadcasting the packets without the flooding tree.

15. The apparatus of claim 12, wherein the processor is further configured to:
- in response to detecting the network disruption event, broadcast link state network packets to the node devices in the new flooding tree such that the link state network packets are sent to all node devices in the network.

16. The apparatus of claim 12, wherein the processor is further configured to obtain comprise instructions operable to obtain switch identifier information that identifies node connectivity such that a high switch identifier value indicates a low priority root node for the flooding tree and a low switch identifier value indicates a high priority root node for the flooding tree.

* * * * *